March 8, 1966  E. GOTTESMANN  3,238,838
VIEWING AND ILLUMINATING DEVICE
Filed March 9, 1959  3 Sheets-Sheet 1

INVENTOR.
EMANUEL GOTTESMANN
BY
*Michael S Striker*
ATTORNEY

March 8, 1966 E. GOTTESMANN 3,238,838
VIEWING AND ILLUMINATING DEVICE
Filed March 9, 1959 3 Sheets-Sheet 2

INVENTOR.
EMANUAL GOTTESMANN
BY Michael S. Striker
ATTORNEY

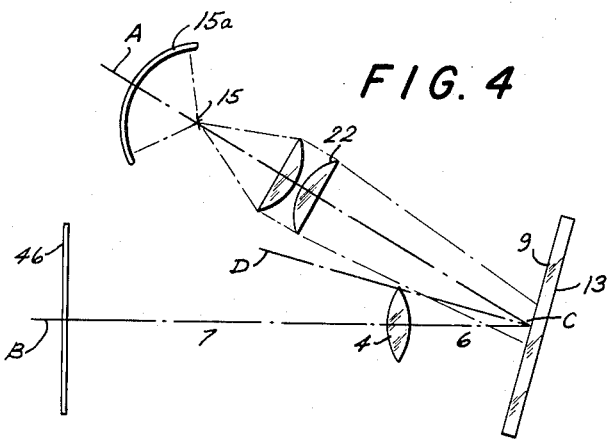
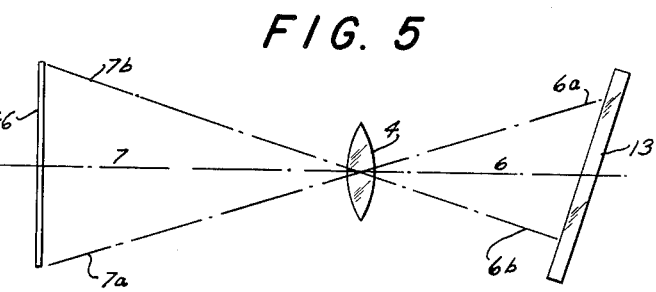
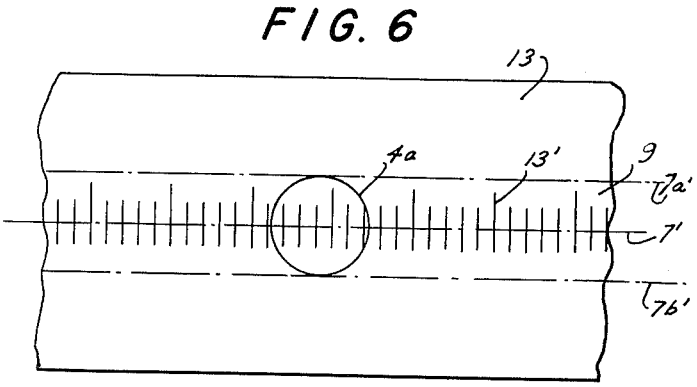
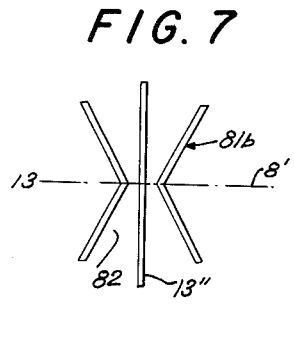
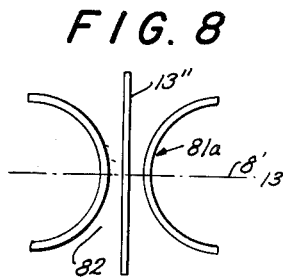
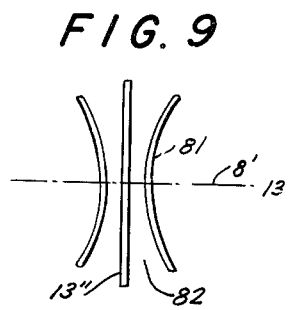

United States Patent Office 3,238,838
Patented Mar. 8, 1966

3,238,838
VIEWING AND ILLUMINATING DEVICE
Emanuel Gottesmann, 322 W. 10th St., New York, N.Y.
Filed Mar. 9, 1959, Ser. No. 798,248
4 Claims. (Cl. 88—14)

The present invention relates to a viewing device, and more particularly to a viewing device which includes means for illuminating and viewing a graduated scale.

The viewing device of the present invention is advantageously employed in connection with machine tools to indicate precise adjustments or positionings of work pieces.

Viewing devices for viewing and reading precision graduated scales by means of a magnifying optical system are known. The optical system used for such purposes can be of the complex microscope type requiring an ocular, or of the simple projection type, showing a magnified image of the viewed part of the graduated scale on a ground glass screen. Projection systems of this type have been used in conjunction with metal scales having reflective surfaces for illumination purposes.

To hold down the size of the indicating optical instrument, lenses having a very short focal length are used, which have a very great aperture. Since in viewing devices of the prior art, the plane of the graduated scale is perpendicular to the optical axis of the lens, the illuminating light must fall at an angle of 90° onto the reflecting surface of the scale in order to the reflected into the lens in direction of the optical axis of the lens. It has been proposed to introduce the light into the optical path by a 45° half-silvered mirror, or by a prism. However, this method is not efficient, since a half-silver mirror loses, for instance, 75% of the light. The short focal length of the lens system requires a short distance between the lens system and the object plane in which the graduated scale is located, and this distance is taken up by the casing of the viewing device. Consequently, it is necessary to direct the illuminating light through the lens system for obtaining a beam of light extending at 90° to the reflecting surface of the graduated scale. More light is lost as the light travels through the additional glass surfaces of the lens system. Furthermore, since the lens system is used as a secondary condenser, the open diameter of the lens system has to be greater than the diameter of the viewed picture area, so that its size is limited. An optical system of this type is rather sensitive regarding the exact position of the light source, and consequently precisely prefocused incandescent bulbs are required.

It is one object of the present invention to overcome the disadvantages of viewing devices according to the prior art, and to provide a viewing device including an illuminating system which illuminates a viewed graduated scale with the greatest possible efficiency.

Another object of the present invention is the provision of an illuminating system in a viewing device effecting reflection of all the light which impinges on the reflecting surface of a graduated scale into the viewing system.

Another object of the present invention is a combined viewing and illuminating system which allows viewing of a graduated scale on a reflecting surface with incident light which defines with the reflecting plane of the graduated scale an angle less than 90°.

A further object of the present invention is to provide a novel catch fork for determining the exact position of the graduated scale, preferably with reference to an enlarged image of the graduated scale which is projected onto a screen.

With these objects in view, the present invention mainly consists in a viewing and illuminating device which comprises lens means having an optical axis; scale means having a reflecting surface located opposite the lens means in a plane inclined to the optical axis; and means for projecting a beam of light at such an angle of incidence against the reflecting surface that the light is reflected by the reflecting surface in direction of the optical axis into the lens means.

The reflecting surface has graduations located in the object plane of the lens means so that the lens means forms an image of the graduations which is preferably projected onto a screen located in the image plane of the lens means. In this manner, the graduations of the scale appear on the screen, and can be evaluated by suitable index lines on the screen.

Preferably, the beam of light extends at an angle between 20° and 45° to the optical axis of the lens means.

In order to increase the magnification of the image on the screen while housing the device in a compact casing, a plurality of reflecting mirrors is provided between the magnifying lens means and the screen.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a schematic side view illustrating the principle of the present invention;

FIG. 5 is a schematic side view illustrating a detail of FIG. 4 on an enlarged scale;

FIG. 6 is a fragmentary front view of a graduated scale used in the device of the present invention;

FIG. 7 is an enlarged front view of one embodiment of a catch fork according to the present invention;

FIG. 8 is an enlarged front view of a modified embodiment of the catch fork according to the present invention; and FIG. 9 is a front view of another modified embodiment of a catch fork according to the present invention.

Figure 1:
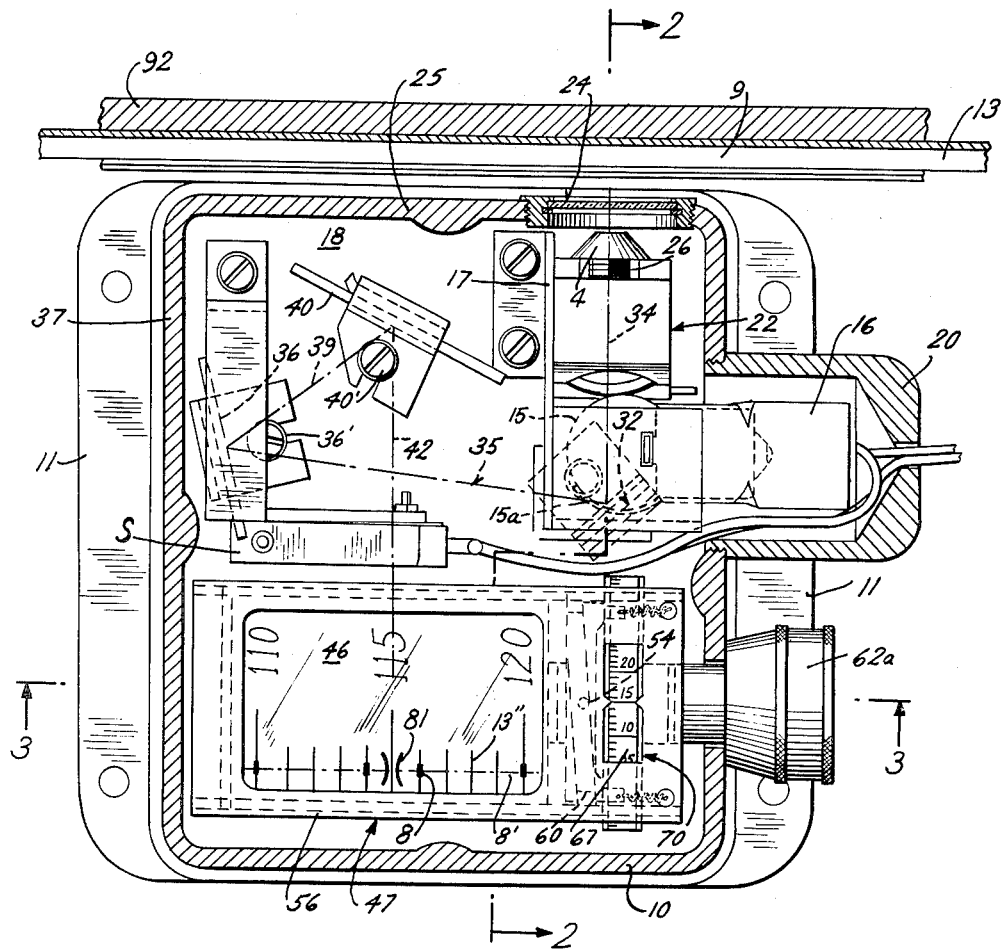
FIG. 1 is a horizontal sectional view through a viewing and illuminating device according to the present invention.

Referring now to the drawings, and more particularly to FIG. 1, a beam of light is produced by the source of light 15 which is provided with a reflector 15a, and with a condenser 22. The beam of light falls onto the highly reflecting surface 9 of a scale member 13 which is provided with graduations 13', as shown in FIG. 6. The light is reflected from the reflecting surface 9 in direction of the optical axis of a lens means 4. The graduated scale on the reflecting surface 9 is partly located in the object plane of lens means 4, and a magnified image of the graduated scale is projected on to the screen 46. The optical path between lens means 4 and the viewed plane is the viewing path 6, and the optical path between the lens means 4 and the screen 46 is the projected path 7. The ratio between the length of paths 7 and 6 is the magnification of the optical system. Reversing mirrors, not shown in FIG. 4, are preferably provided between lens means 4 and screen 46. The graduation lines 13' on the highly reflective, mirror-like surface 9 of the metal scale 13, are preferably engraved and less reflective.

The optical axis A of the illuminating system, and the optical axis B of the viewing system form an angle having an apex C located on the reflecting surface 9. The angle A, C, B should be as small as possible, and is preferably between 20° and 45°. In a preferred embodiment of the present invention, the angle A, C, B is 30°.

In order to obtain reflection of the illuminating light by the reflecting surface 9 in direction of the optical axis B, it is necessary that the surface 9 is perpendicular to the bisectant D of the angle A, C, B.

In other words, the angle of incidence A, C, D on the reflecting surface 9 must be half the angle A, C, B between the direction of the beam of light and the optical axis of the lens means 4.

In this position, the highly reflective surface 9 acts like a mirror, reflecting the light from the illuminating system into the viewing lens means 4. It is apparent that the optical axis B of the lens means 4 is not perpendicular to the surface 9, but defines with the same an angle of 90° minus half the angle between the optical axis A and B of the illuminating and viewing systems.

As shown in FIG. 5, the outer rays 6a, 7a and 6b, 7b are of different length so that ray 6a, 7a will produce a lesser magnification than ray 6b, 7b. Consequently, the image of the graduations 13' projected on the screen 46 will show the projected graduation lines not parallel to each other, but slightly converging, the side with the narrower spaces corresponding to the lesser magnification of the associated rays 6a, 7a and the side with the wider spaces corresponding to the associated rays 6b, 7b which produce greater magnification. FIG. 6 shows a portion of the scale 13 with graduations 13'. The circle 4a indicates the area of the scale which is projected by lens 4 onto the screen 46. The line 7a' represents the position of all associated rays 6a, 7a, the line 7b' represents the position of all associated rays 6b, 7b, and line 7' represents the position of all rays 6, 7. Rays 6, 7 project the part of the scale where the surface 9 intersects the object plane of lens 4 along the line 7', and produce on screen 46 sharp images of the points of the graduations 13' located in line 7' along which the optical axis of lens 4 moves during movement of scale 13.

The images 13" of graduations 13' and the spaces therebetween appear more magnified along line 7b' than along line 7a' which is caused by the inclination of scale 13 to the optical axis of the lens 4. Accurate reading is only possible along line 7'.

The screen 46 is provided with index lines 8, as best seen in FIG. 1, and the distance between two index lines 8 corresponds to the distance, or to a multiple of the distance along line 7' between the images 13" of two graduation lines 13' at the desired magnification. As shown in FIG. 9, a catch fork 81 has two reference lines which are symmetrical to a vertical line, as viewed in FIG. 9, and also symmetrical to a transverse axis passing through the points of the reference lines where the distance between the reference lines is shortest. This transverse axis of a catch fork 81 is an imaginary line 8' which must coincide with the image of imaginary line 7' of the graduated scale 13 to obtain accurate readings.

As explained above, the images 13" will slightly converge on the screen 46, and the desired exact magnification at which two index lines 8 coincide with two graduation lines 13" has to be established along the image of line 7'. The scale 13 moves in the direction of line 7' and screen 46 moves in the direction of line 8'. The exactly spaced index lines 8 are provided for allowing rectification of the magnification. Adjusting the length of the optical path 7 between lens 4 and screen 46 will vary the magnification of the optical system, and the desired magnification is reached when the images of the points of the graduations 13' located along line 7' coincide with corresponding points of the exactly distanced index marks 8 located along line 8'. Due to the shape of the catch fork, the position of the imaginary line 8' can be easily imagined and the screen adjusted so that line 8' coincides with the centers of projected graduations 13" which are sharply imaged along line 7'. The adjusting operation will be described hereinafter with reference to a practical embodiment.

The distance between graduation lines 13' imaged on the screen 46 can now be interpolated by superimposing subdividing scale graduations along line 8' on the screen, using a projected graduation line as an indicating hair line, and utilizing the catch fork 81 which is marked on the screen exactly aligned with the centers of index marks 8 along line 8' where constant magnification is maintained and indicated.

Known catch forks consist of two parallel lines which are positioned to straddle a hair line. A small light gap appears between the inside edges of the catch fork and the edge of the hair line, and the eye of the observer evaluates whether the small light gaps are of the same width on both sides of the hair line. However, different human eyes require different widths of the gaps for best evaluation.

In accordance with the present invention, a catch fork is provided which includes two diverging reference lines, as shown in FIGS. 7 to 9. A catch fork 81b having angular reference lines is shown in FIG. 7, a catch fork having part-circular reference lines is shown in FIG. 8, and a catch fork 81 having hyperbolic reference lines is shown in FIG. 9. The catch forks according to the present invention cooperate with images 13" of the graduations 13' which constitute a hair line between the two diverging reference lines. The catch forks according to the present invention allow the eye of the observer to travel along the gradually narrowing gaps 82 and select the width of the gaps which is best suited for the observer's eyes for proper evaluation, while automatically estimating the positions of the narrowest portions of the gaps 82. It is evident that the shortest distance along axis 8' between the reference lines of the catch forks is slightly greater than the thickness of the image 13" of a graduation line 13'. It is important that the catch fork is placed in such way that the imaginary axis 8', in other words the center portions of the reference lines where the gaps 82 are smallest, are located in the path of movement of direction line 7', as shown in FIGS. 1, 7, 8 and 9 since only the points of the graduation lines 13 along the imaginary line 7' are accurately projected, whereas the ends of lines 13' are projected onto the screen at different magnifications along imaginary lines 7a' and 7b. The observer exactly evaluates the proper straddling of the catch fork 81 over the projected hair line 13" at the part of the projected scale where the desired magnification is obtained by proper adjustment.

A practical embodiment of the present invention will now be described with reference to FIGS. 1 to 3. A viewing and illuminating device according to the present invention comprises a casing 10 which is secured by mounting flanges 11 to a supporting member of a machine tool or the like (not shown).

An elongate scale member 13, which is normally carried by the movable carriage of the machine tool (not shown), is located in front of casing 10 and is provided with graduations 13' and sub-divisions between the same. A small incandescent electric bulb 15 is supported in a socket 16 carried by a bracket 17 which is secured to the base 18 of casing 10. Socket 16 is enclosed by a removable screw cap 20. A switch S is mounted in the casing and connected in the circuit of bulb 15, to turn the bulb on when the hinged cover 10' of casing 10 is opened. A reflector 15a, as described with reference to FIG. 4, may be provided for bulb 15. A condenser 22 concentrates the light of the light source 15, and directs the beam of light through a transparent window 24 located on the front wall 25 of casing 10 so that the concentrated light strikes a portion of surface 9 located adjacent the transparent window 24. The angle between the direction of the beam of light, and the reflecting surface 9 is chosen as explained with reference to FIG. 4 so that the light is reflected from surface 9 through window 24 and into the magnifying lens means 4 which is held by a tubular holder 26. Holder 26 is externally threaded and inclined in a mounting block 27 secured in casing 10. An opening 30 of a plate 29 is aligned with the axis of the magnifying lens means 4, and the arrangement is such that the brightly lighted portion of surface 9 of scale member 13 reflects the light rays back through window 24, lens means 4 and opening 30.

In the path of the light rays, a vertical mirror 32 is arranged to reflect the light rays to the left as viewed in FIG. 1. The broken line 34 represents the reflected light which passes from the illuminated surface portion of scale member 13 through lens means 4 and opening 30 to strike mirror 32. The rays reflected by mirror 32 follow a path represented by broken line 35 and strike a second vertical mirror 36 which is located adjacent side wall 37 of casing 10. Mirror 36 reflects the rays of light in forward direction along broken line 39 until the light strikes a third mirror 40. Mirror 40 reflects the light rays toward the rear of casing 10 as indicated by the broken line 42.

Figure 2:
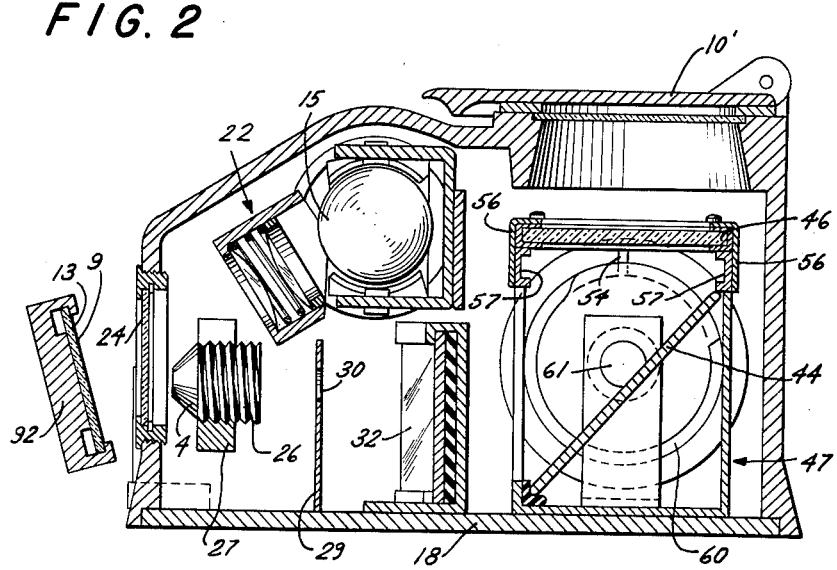
FIG. 2 is a vertical sectional view taken on line 2—2 of FIG. 1.

The rays reflected by mirror 40 strike an inclined mirror 44, see FIG. 2, which is arranged at a 45° angle with respect to vertical and horizontal planes. Mirror 44 has the largest reflecting surface and is located below a flat horizontal screen member 46 which is mounted on the top of a screen frame 47 of generally rectangular configuration. Screen member 46 may be made of ground glass, and is provided with the index lines 8 and with a catch fork 81 aligned along direction line 8', as previously described. As shown in FIG. 1, images of indicia numbers on the surface 9, will also appear on the screen 46.

Figure 3:
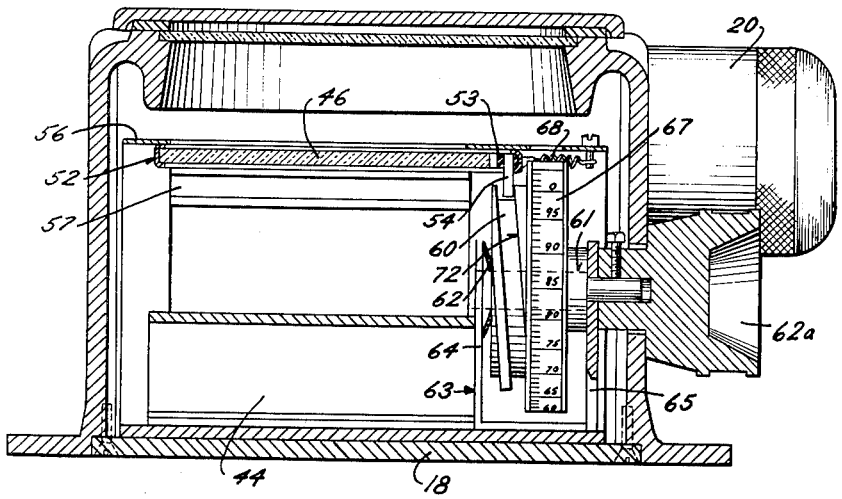
FIG. 3 is a vertical sectional view taken on line 3—3 of FIG. 1.

Screen 46 is adjustable and is mounted on a frame 52, shown in FIGS. 1 to 3, which extends around screen 46 and engages three of the four edges of screen 46 in channels. One end of frame 52 is spaced from the corresponding edge of screen 46, and a rigid bar 53 is arranged in such space and carries a depending pin 54 constituting a cam follower engageable with a rotary cam member 60.

The ends of bar 53 are received in the flanges of the chanel-section frame 52. Frame 52 is longitudinally slidable in guides provided by upper members 56 of housing 47 and by angle-section members 57 which are secured to members 56 to provide spaces for frame 52.

Rotary cam 60 is carried by a shaft 61 which is provided with an adjusting knob 62a. Shaft 61 is carried by U-shaped bearing bracket 63 which is secured to the base 18 of casing 10. Brackets 63 has legs 64 and 65 in which shaft 61 is supported. Shaft 61 carries a rotary scale or dial 67 which is located adjacent cam 60 and is frictionally connected to the same so that rotary scale 67 and cam 60 normally turn together as a unit when knob 62a is turned. However, the position of scale 67 relative to cam 60 can be adjusted so that differently numbered graduations on scale 67 are visible in a window 70 provided in the upper portion of the housing 47 directly above the rotary scale 67. This arrangement enables adjustment of scale 67 for zero reading when cam 60 is in an end position engaged by a fixed stop, not shown.

Spring means 68 are attached to a frame 52 and urge screen 46 to move from the left to the right as viewed in FIGS. 1 and 3. A spring washer 62 is mounted on shaft 61 so that cam 60 and shaft 61 are spring-loaded to maintain cam 60 in a predetermined axial position. Spring 68 acts to hold the cam follower pin 54 firmly in engagement with the driving cam truck 72 of cam 60, as best seen in FIG. 3.

This arrangement prevents any lost-motion during the shifting of the screen 46, and the slightest turning movement of knob 62a will cause corresponding movement of screen 46 in direction of the direction lines 7' and 8'.

The shifting movements of screen 46 can be referred to by index lines 8 and catch fork 81 to the images 13'' of the graduations 13' of scale member 13, so that minute movements of scale 13 with respect to casing 10 and the frame of the machine tool can be determined.

The movement of the screen with index lines 8 and catch fork 81 is related to the graduations on the rotary scale 67 so that decimal or fractional portions of the spaces between projected graduations 13'' may be readily interpolated. Desired decimal values may be preset by shifting screen 46 and matching marks or lines, so that the machine operator is enabled to accurately feed a work piece a desired distance by referring to the index lines and projected graduations on the screen.

The pitch of cam track 72 of cam 60 is made sufficiently great so that slightly less than one complete turn of cam 60 will shift screen 46 a distance equal to the space between two imaged graduation lines 13''. In this manner, screen 46 can be fully adjusted by a single turn of the rotary scale 67.

Scale member 13 is mounted in an elongate channel member 92 in such way that the optical axis of lens 4 is traversed by points of graduations 13' located on the imaginary line 7'. During motion of scale 13, the distance between surface 9 and lens 4 is maintained by channel guide 92.

The device is operated as follows:

Scale wheel 67 is set to zero, which corresponds to the zero position of catch fork 81. Scale member 13 is adjusted until its zero line is located in the catch fork 81. When the machine is operated, scale 13 is displaced, and a new graduation line appears on screen 46 near the catch fork. The screen is shifted by turning of knob 62a until the catch fork straddles the respective graduation nearest thereto. The indication of scale wheel 67 is read, and added to the amount indicated by the respective imaged graduation 13''.

It will be understood that the angles between the optical axis of lens 4, the reflecting surface 9 of scale member 13, and the axis of the condsenser 22 are chosen as described with reference to FIG. 4 so that all the light projected through condenser 22 onto the highly reflecting surface 9 of scale member 13, will be reflected by surface 9 in direction of the optical axis of the lens means 4 and through lens means 4 so that the light is further reflected by the four mirrors 32, 36, 40 and 44 until it finally reaches screen 46. The path of the light along lines 34, 35, 39 and 42 corresponds to the path 7 shown in FIG. 4 so that the magnification of the system is correspondingly determined. Mirrors 36 and 40 are adjustable, and have bases formed with cutouts through which holding screen 36' and 40' pass. By adjustment of mirrors 36 and 40, the length of the path 7 can be adjusted so that the same magnification can be obtained irrespective of the different focal length deviations of individual lens means 4, and lens means 4 may be positioned nearer to or farther from scale member 13 when casing 10 is mounted on a machine tool.

It will be understood that each of the elements described above, or two or more together, may also find a useful application in other types of viewing devices differing from the types described above.

While the invention has been illustrated and described as embodied in a viewing and illuminating device for evaluating a graduated scale on a highly reflective surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an optical reading arrangement for a graduated scale in combination, magnifying lens means having an optical axis; scale means having a surface located opposite said lens means crossing said optical axis and having an inclination relative to the same for optimal illumination, said surface having elongated straight graduations extending in the direction of said inclination of said surface of said scale means so that different portions of said graduations are spaced different distances from said lens means, said scale means being movable in longitudinal direction thereof perpendicularly to said graduations so that said optical axis is traversed by points of said elongated straight graduations located on a first imaginary direction line extending in said direction; movable screen means located in the image plane of said lens means so that said lens means forms magnified images of said graduations on said screen means, said magnified images converging due to the inclination of said reflecting surface so that only said points of said graduations located on said first imaginary direction line are accurately imaged at the same magnification, said screen means having a catch fork including two reference lines disposed at an angle and symmetrical to an axis perpendicular to a second direction line, the shortest distance between said reference lines being located along said second direction line and being slightly greater than the thickness of the image of each of said graduations, said screen means and said catch fork being in a position in which said second direction line is superimposed on said first direction line whereby said images of said graduations are read where the shortest distance between said reference lines of said catch fork indicates the position of the images of said points of said graduations where the magnification is accurate and remains the same during movement of said catch fork along said second direction line; means for moving said screen means in the direction of said second direction line; and indicating means for indicating the displacement of said screen means and of said catch fork.

2. In an optical reading arrangement for a graduated scale, in combination, magnifying lens means having an optical axis; scale means having a surface located opposite said lens means crossing said optical axis and having an inclination relative to the same for optimal illumination, said surface having elongated straight graduations extending in the direction of said inclination of said surface of said scale means so that different portions of said graduations are spaced different distances from said lens means, said scale means being movable in longitudinal direction thereof perpendicularly to said graduations so that said optical axis is traversed by points of said elongated straight graduations located on a first imaginary direction line extending in said direction; movable screen means located in the image plane of said lens means so that said lens means forms magnified images of said graduations on said screen means, said magnified images converging due to the inclination of said reflecting surface so that only said points of said graduations located on said first imaginary direction line are accurately imaged at the same magnification, said screen means having a catch fork including two reference lines transverse to a second imaginary direction line and diverging from each other symmetrical to an axis perpendicular to said second direction line, the shortest distance between said reference lines being located along said second direction line and being slightly greater than the thickness of the image of each of said graduations, said screen means and said catch fork being in a position in which said second direction line is superimposed on said first direction line whereby said images of said graduations are read where the shortest distance between said reference lines of said catch fork indicates the position of the images of said points of said graduations where the magnification is accurate and remains the same during movement of said catch fork along said second direction line; means for moving said screen means in the direction of said second direction line; and indicating means for indicating the displacement of said screen means and of said catch fork.

3. In an optical reading arrangement for a graduated scale, in combination, magnifying lens means having an optical axis; scale means having a specular reflecting surface located opposite said lens means crossing said optical axis and having an inclination relative to the same for optimal illumination, said surface having elongated straight graduations extending in the direction of said inclination of said surface of said scale means so that different portions of said graduations are spaced different distances from said lens means, said scale means being movable in longitudinal direction thereof perpendicularly to said graduations so that said optical axis is traversed by points of said elongated straight graduations located on a first imaginary direction line extending in said direction; movable screen means located in the image plane of said lens means so that said lens means forms magnified images of said graduations on said screen means, said magnified images converging due to the inclination of said reflecting surface so that only said points of said graduations located on said first imaginary direction line are accurately imaged at the same magnification, said screen means having a catch fork including two reference lines disposed at an angle and symmetrical to an axis perpendicular to said second direction line, the shortest distance between said reference lines being located along said second direction line and being slightly greater than the thickness of the image of each of said graduations, said screen means and said catch fork being in a position in which said second direction line is superimposed on said first direction line whereby said images of said graduations are read where the shortest distance between said reference lines of said catch fork indicates the position of the images of said points of said graduations where the magnification is accurate and remains the same during movement of said catch fork along said second direction line; means for moving said screen means in the direction of said second direction line; indicating means for indicating the displacement of said screen means and of said catch fork; and means for projecting a beam of light against said specular reflecting surface at an angle of incidence which is half the angle between the axis of the beam of light and said optical axis so that the light is reflected by said reflecting surface in the direction of said optical axis into said lens means to be projected onto said screen means, the axis of said beam of light and said optical axis being located in a plane perpendicular to said reflecting surface.

4. In an optical reading arrangement for a graduated scale, in combination, magnifying lens means having an optical axis; scale means having a specular reflecting surface located opposite said lens means and crossing said optical axis and having an inclination relative to the same for optimal illumination, said surface having elongated straight graduations extending in the direction of said inclination of said surface of said scale means so that different portions of said graduations are spaced different distances from said lens means, said scale means being movable in longitudinal direction thereof perpendicularly to said graduations so that said optical axis is traversed by points of said elongated straight graduations located on a first imaginary direction line extending in said direction; movable screen means located in the image plane of said lens means so that said lens means forms magnified images of said graduations on said screen means, said magnified images converging due to the inclination of said reflecting surface so that only said points of said graduations located on said first imaginary direction line are accurately imaged at the same magnification, said screen means having a catch fork including two reference lines transverse to a second imaginary direction line and diverging from each other on both sides of said second direction line symmetrical to an axis perpendicular to said second direction line, the shortest distance between said reference lines being located along said second direction line and being slightly greater than the thickness of the image of each of said graduations, said screen means and said catch fork being in a position in which said second direction line is superimposed on said first direction line whereby said images of said graduations are read where the shortest distance between said reference lines of said catch fork indicates the position of the images of said points of said graduations where the magnification is accurate and remains the same during movement of said catch fork along said second direction line; means for moving said screen means in the direction of said second direction line; indicating means for indicating the displacement of said screen means and of said catch fork; and means for projecting a beam of light against said specular reflecting surface at an angle of incidence which is half the angle between the axis of the beam of light and said optical axis so that the light is reflected by said reflecting surface in the direction of said optical axis into said lens means to be projected onto said screen means, the axis of said beam of light and said optical axis being located in a plane perpendicular to said reflecting surface.

References Cited by the Examiner

UNITED STATES PATENTS

| | | | |
|---|---|---|---|
| 1,487,514 | 3/1924 | Goss | 88—24 |
| 1,704,756 | 3/1929 | McNair | 88—24 |
| 2,420,503 | 5/1947 | Stechbart | 88—1 |
| 2,422,611 | 6/1947 | Becker et al. | 88—1 |
| 2,491,667 | 12/1949 | Kent | 33—125 |
| 2,564,068 | 8/1951 | Kearns | 88—14 |
| 2,618,194 | 11/1952 | Kawabata | 88—14 |
| 2,619,002 | 11/1952 | Baker | 88—1 |
| 2,725,781 | 12/1955 | Banker | 88—1 |
| 2,795,992 | 6/1957 | Tao | 88—14 |
| 2,852,976 | 9/1958 | Hoffmann | 88—14 |
| 2,853,915 | 9/1958 | Mitchell | 88—14 |
| 2,879,692 | 3/1959 | Turner | 88—14 |
| 2,884,831 | 5/1959 | Rawlings et al. | 88—14 |
| 2,933,404 | 7/1961 | Rouy | 88—1 |

FOREIGN PATENTS

| | | |
|---|---|---|
| 4,909 | 4/1956 | Germany. |
| 154,546 | 8/1932 | Switzerland. |

JEWELL H. PEDERSEN, *Primary Examiner.*

EMIL G. ANDERSON, *Examiner.*

R. C. KLETT, E. J. CONNORS, L. ORLOFF, W. L. SIKES, *Assistant Examiners.*